United States Patent [19]

Berchem

[11] Patent Number: 4,662,047

[45] Date of Patent: May 5, 1987

[54] METHOD OF MAKING A ONE-PIECE PISTON FOR AN INTERNAL-COMBUSTION ENGINE

[75] Inventor: Rütger Berchem, Gelsenkirchen, Fed. Rep. of Germany

[73] Assignee: Berchem & Schaberg GmbH, Gelsenkirchen, Fed. Rep. of Germany

[21] Appl. No.: 822,002

[22] Filed: Jan. 24, 1986

[30] Foreign Application Priority Data

Jan. 24, 1985 [DE] Fed. Rep. of Germany ....... 3502248

[51] Int. Cl.[4] ...................... B23P 15/10; B21D 28/00

[52] U.S. Cl. ........................ 29/156.5 R; 29/DIG. 18; 29/DIG. 25; 72/334; 72/335; 72/356; 92/172; 92/208; 123/193 P

[58] Field of Search .................. 29/156.5 R, DIG. 18, 29/DIG. 25; 92/172, 208; 123/193 P; 72/334, 335, 356

[56] References Cited

U.S. PATENT DOCUMENTS

| | | | |
|---|---|---|---|
| 2,465,792 | 3/1949 | Davis | 92/208 |
| 2,539,903 | 1/1951 | Gruetjen | 29/156.5 R |
| 2,756,876 | 7/1956 | Watson et al. | 29/156.5 R |
| 2,795,467 | 6/1957 | Colwell | 29/156.5 R |
| 3,237,532 | 3/1966 | Clark | 29/156.5 R X |
| 3,264,717 | 8/1966 | Class et al. | 29/156.5 R |
| 3,305,918 | 2/1967 | Christen et al. | 29/156.5 R |
| 4,532,686 | 8/1985 | Berchem | 29/156.5 R |

FOREIGN PATENT DOCUMENTS 3222582 12/1983 Fed. Rep. of Germany .

*Primary Examiner*—Mark Rosenbaum
*Assistant Examiner*—Ronald S. Wallace
*Attorney, Agent, or Firm*—Karl F. Ross; Herbert Dubno

[57] ABSTRACT

A one-piece piston is produced by die pressing in a single step, a previously forged blank to bend an annular cylindrical collar thereon and at the same time form a fire rib between two lugs which are pierced in the die-pressing tool so that eyes are formed in the lugs and the latter are calibrated by the piercing operation.

5 Claims, 6 Drawing Figures

METHOD OF MAKING A ONE-PIECE PISTON FOR AN INTERNAL-COMBUSTION ENGINE

FIELD OF INVENTION

My present invention relates to a method of producing a piston for an internal-combustion engine and, more particularly, to a one-piece piston which comprises a piston crown (in the form of a generally cylindrical flange) adapted to ride along a cylinder wall, and a piston body or shaft (lying centrally within this crown) enabling the piston to be pivotally connected to a piston rod via the latter to a crank shaft. The piston crown can accomodate piston rings if desired.

BACKGROUND OF THE INVENTION

While various methods of fabricating pistons have been provided heretofore, the present invention can be considered an improvement on the method described in the printed German application No. DE-05 32 22 582 and my corresponding U.S. Pat. No. 4,532,686 issued Aug. 6, 1985, in which a blank is die-forged to produce a piston head with a cylindrical flange bent from a disc-shaped blank into the piston crown flange.

The piston body can be provided with bores forming eyes through which the pivot pin is inserted to couple the piston or connecting rod to this position.

In these earlier systems, the piston shaft is an independent element and generally is formed by casting and machining, the piston crown and the shaft or body being united by a screwthread arrangement.

A piston of the aforedescribed type has been found to be suitable for heavy Diesel engines and like machines.

For high-speed internal-combustion engines, namely high compression engines and like modern gasoline engines for automotive vehicles, such pistons are seldom completely satisfactory.

For high-speed internal-combustion engines of the high compression and high fuel efficiency type, composite or assembled pistons are not satisfactory and generally one-piece pistons, preferably of steel in an increasing number of cases, are desired.

In the past, one-piece steel piston have been fabricated by casting a steel body and then machining the same to the desired dimensions and configuration.

Obviously, this method of fabrication is expensive but, even more important is the fact that this fabrication method does not provide a one-piece piston with optimum structural properties. For example, neither the strength nor distortion-resistance characteristics are satisfactory in many cases and especially where the structure is comparatively thin-walled, both strength and freedom from distortion may be lacking.

OBJECTS OF THE INVENTION

It is the principal object of my present invention to provide an improved method of fabricating a one-piece piston from steel with a shaft or body and a crown or flange whereby the drawbacks of earlier methods are obviated.

Another object of this invention is to provide a method of making a one-piece piston which optimizes the strength and distortion resistance of the piston even in comparatively thin-walled regions thereof.

Still another object of my invention is to provide an improved method of making a one-piece piston which is more economical than earlier methods and is especially effective in providing a high-efficiency piston for use in modern high speed internal-combustion engines operating with high combustion ratios.

SUMMARY OF THE INVENTION

These objects and others which will become apparent hereinafter are attained, in accordance with the present invention, in a method of making a one-piece piston from a steel blank which comprises forming by die-pressing or forging in a single stroke in a roughed-out piston blank having a planar disc-shaped flange formed unilaterally with a pair of mutually parallel posts rising from this flange, the single stroke of a die press being applied axially to fashion the roughed-out collar in the form of a disc surrounding the piston cap and the posts so that they rise from a transition region between this collar and cap.

In a single die pressing step, this roughed-out piston is deformed axially to bend the flange into a generally cylindrical crown, whereupon passages are pierced in the posts by displacing an embossing or eye-shaping tool transversed to form eyes accommodating the pivot pin of the connecting root. This latter single press stroke is applied in the axial direction and the posts can be narrowed during the pressing operation and the eye-embossing or calibrating tool introduced through the die pressing tool to establish the dimensions of the pendulum or swinging posts or lugs. The second pressing stroke not only forms the cylindrical crown but establishes the heat throttling ling gap between it and the piston body and forms piston top lands or fire ribs or webs between the posts.

The blank is die-pressed or forged at conventional forging temperatures and flashing can be removed as is conveniently although the piston requires no extensive machining operation face shaping or the like other than the formation of the bores in the eyes before the latter step is concluded. Of course, the crown can then be machined to final dimensions shaped to accomodate the piston rings.

The principal reason why the method of the instant invention is successful in producing a one-piece piston effectively in a single die-pressing operation is that not only are the eyes rising from the piston head calibrated simultaneously with the bending of the collar of the crown but because of the die-pressing operation and especially favorable fiber orientation is found in the steel body at the junction between the piston head and the eyes, lugs or posts. This is, in part, because of the generally radial fiber orientation in flange and cap and axial fiber orientation in the lugs afforded by the first die-pressing or forging operation described.

Indeed, the bending of the crown from the disc-shaped flange of the blank also poses no problem which may cause a reduction in the strength in this region or crack formation as long as, with the bending, at least one top land of the piston (and preferably two) is simultaneously formed in this bending operation. The top lands can be fire ribs or webs bridging the lugs or posts.

These advantages are particularly obtained when the piston crown roughed-out including the blank portion adapted to be bent to form the collar has, as noted, a radial fire pattern formed by the first-mentioned forging and independently of the axial fiber pattern imparted to the lugs or posts. When the posts or lugs are calibrated during the second die-pressing or forging operation, they, too, are found to have an effective directional fiber pattern which promotes increased strength and stability.

The one-piece pistons of the invention can be fabricated from various materials although best results are obtained, and indeed this is an important feature of the invention, with 40 Mn 4 Steel and 42 Cr Mo 4 Steel, these abbreviations corresponding to the designations in German Industrial Standard DIN 17 006, or Nickel-based alloys. The 40 Mn 4 Steel can have 0.36% to 0.44% by weight carbon, 0.25% to 0.50% by weight silicon and 0.80% to 1.1% by weight manganese, with the balance being iron.

The Nickel-based alloys which are also suitable can include INVAR steels.

Typical Nickel steels which can be used have carbon contents between 0.25 to 0.35% by weight, about 0.25% by weight silicon, about 0.70% by weight manganese, and 1.2, 1.4 or 2% Nickel. In general, the Nickel content can range between 1% by weight and 9% by weight.

BRIEF DESCRIPTION OF THE DRAWING

The above and other objects, features and advantages of the present inventions will become more readily apparent from the following description, reference being made to the accompanying drawing in which.

SPECIFIC DESCRIPTION

Figure 1:
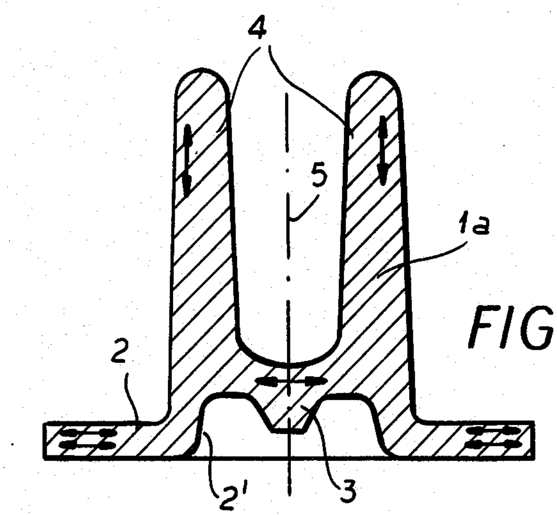
FIG. 1 is an axial sectional view through a blank for the formation of a one-piece piston according to the invention.
Figure 2:
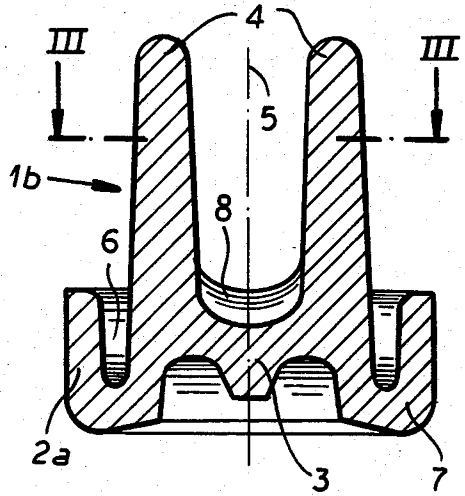
FIG. 2 is an axial section corresponding to FIG. 1 but showing the one-piece piston body after forging, with the crown shoulder or flange and the top land.
Figure 4:
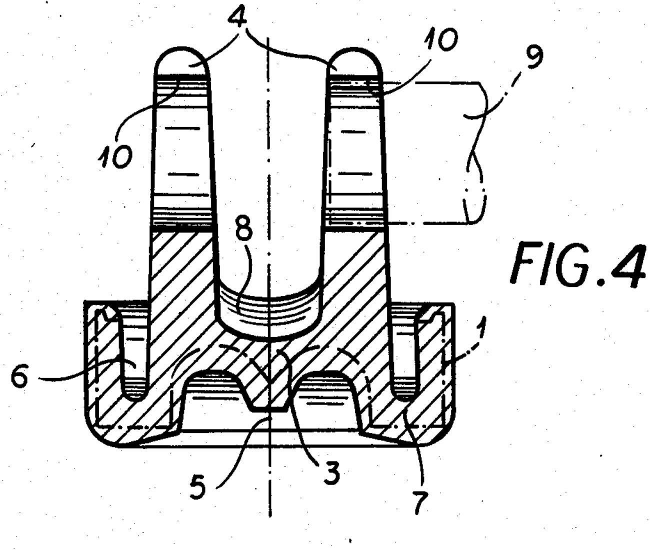
FIG. 4 is a view similar to FIG. 2 showing the result and the single die-pressing or forging of the piston rough-out and illustrating the eyes which have been formed therein simultaneously with that die-pressing.

A comparison of FIGS. 1, 2 and 4 reveals the distinct steps in the production of a one-piece piston for high speed internal combustion engines of the gasoline-fuel type and, specifically, a high compression gasoline engine.

As can be seen from FIG. 1, for example, the rough-out which forms the starting point for the production of the annular piston collar of the invention can be forged in a single operation from a blank of the steel with an annular flange 2 having a recess 2' within which a piston head 3 rises to form a protuberance and from which, in addition, on the opposite side, a pair of posts 4 rises parallel to the axis 5 ultimately to form the lugs whereby a piston rod is journaled to swing relative to the piston. The roughed-out blank is designated as **1*a* in FIG. 1 and is ultimately shaped to form the piston 1 (FIG. 4**).

From the blank **1*a* shown in FIG. 1 the semifinished piston shape represented at 1*b* in FIG. 2 is die pressed or forged in a single die-pressing operation between a die and a press ram relatively movable parallel to the axis 5**.

Figure 5:
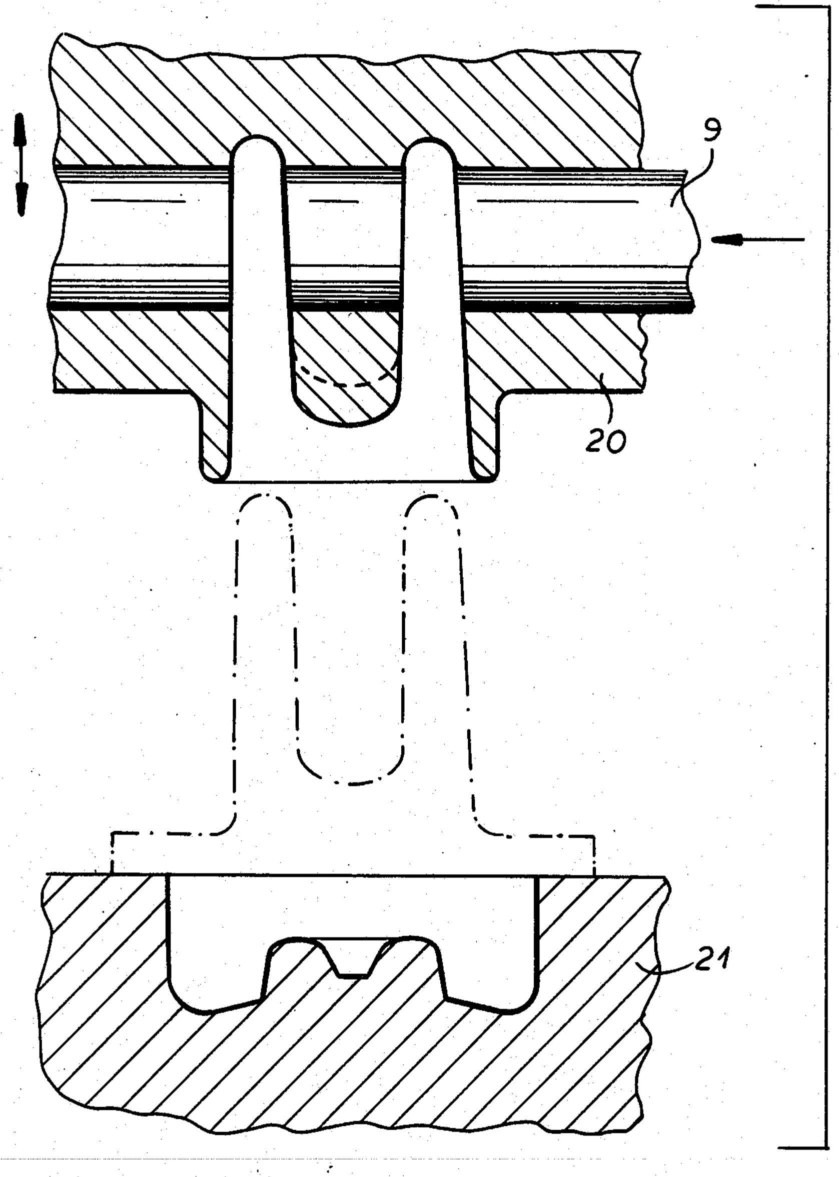
FIG. 5 is a cross sectional view showing the die press in which the roughed-out piston body of FIG. 1 is in a single press operation transformed into the final piston shape of FIG. 2.

FIG. 5 shows the ram and the die in a separated position before insertion of the blank **1*a***.

Figure 3:
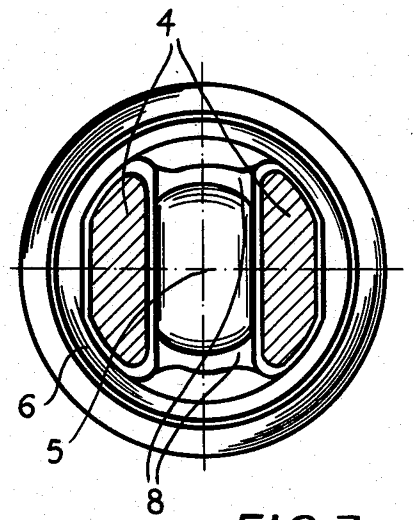
FIG. 3 is a section taken along the line III—III of FIG. 2.

As a comparison of FIGS. 1 and 2 will show, the single step forming operation bends the flange 2 to form an annular collar **2*a* which is spaced by a heat flow restricting annular gap 6 connected with a piston crown shoulder 7 while top lands or fire ribs 8 are simultaneously formed as is best seen in FIG. 3. At least one such rib should connect the posts or lugs 4**.

As is apparent from FIG. 4, moreover, while the piston body is held in the die 20, 21 of FIG. 5, a piercing tool or embossing tool, or the like represented at 9 can be displaceable perpendicular to the axis 4 to pierce the bores 10 which ultimately serve to journal the piston rod swingably on the piston. The piercing tool 9 can pierce through the ram shown in FIG. 5 when the latter is in its closed position to form the bores 10.

Figure 6:
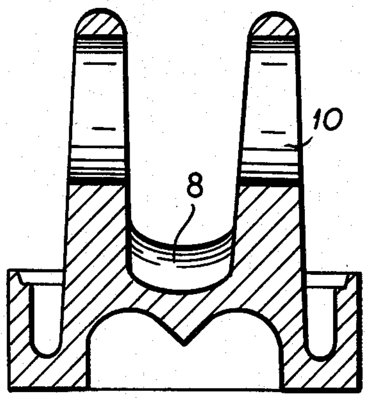
FIG. 6 is a cross sectional view of the finished piston, after machining.

The piston body in FIG. 4 can be further machined as shown in dot-dash lines to ultimately yield the piston illustrated at **1*c* in FIG. 6**. The piercing tool can be a wedge-force driven member.

The radial fiber orientation pattern in the flange and the axial fiber orientation pattern in the posts are represented by arrows in FIG. 1.

I claim:

1. A method of making a piston for an internal-combustion engine which comprises the steps of:

die forging a blank of steel to produce a circular planar flange surrounding a recess into which a piston head projects at one side and having a pair of posts rising from an opposite side and flanking an axis of said blank;

thereafter die pressing said blank in a single step to bend said flange into a substantially annular collar separated from said piston head by an annular gap restricting heat flow and connected to said head by a piston crown shoulder while forming at least one fire rib bridging said posts and shaping said posts to the final configuration of respective lugs adapted to swingably connect said piston to a piston rod; and in conjunction with said die-pressing operation, piercing said lugs to form respective eyes therein and simultaneously calibrating eyes.

2. The method defined in claim 1 wherein said blank is die forged so that at least along said flange said blank has a radial fiber-running pattern.

3. The method defined in claim 1 wherein said posts are die forged so as to have a substantially axial fiber-running pattern with respect to the axis of the piston.

4. The method defined in claim 1 wherein said eyes are pierced by displacing material with a displacement mandrel traversing a passage in a die-pressing tool.

5. The method defined in claim 1 wherein said blank is forged from 40 Mn 4, 42 Cr $Mo_4$ or a nickel-based steel alloy.

* * * * *